United States Patent [19]

Zimmerman

[11] Patent Number: 4,844,174
[45] Date of Patent: Jul. 4, 1989

[54] PRESS WHEELS FOR SEED DRILLS

[76] Inventor: Robert Zimmerman, Box 6, Almira, Wash. 99103

[21] Appl. No.: 33,516

[22] Filed: Apr. 1, 1987

[51] Int. Cl.[4] .............................................. A01B 35/16
[52] U.S. Cl. ..................... 172/538; 172/172; 172/177; 111/195
[58] Field of Search ..................... 111/85, 87; 172/156, 172/172, 177, 534, 538, 555, 560, 574

[56] References Cited

U.S. PATENT DOCUMENTS

| | | | |
|---|---|---|---|
| 595,397 | 12/1897 | Lauderdale | 172/534 |
| 650,205 | 5/1900 | Towle | 172/555 |
| 1,901,299 | 3/1933 | Johnson | 111/85 |
| 2,034,579 | 3/1936 | Hurtig | 172/555 |
| 2,098,738 | 11/1937 | Campbell | 172/530 |
| 2,193,275 | 3/1940 | Elliott | 172/143 |
| 2,196,038 | 4/1940 | Silver | 172/143 |
| 2,211,878 | 8/1940 | Benjamin | 172/555 |
| 2,236,832 | 4/1941 | Nielsen | 172/530 |
| 2,331,819 | 10/1943 | West | 111/85 |
| 2,780,975 | 2/1957 | Gunning | 172/43 |
| 2,924,189 | 2/1960 | McLeod | 111/85 |
| 3,097,704 | 7/1963 | Gillespie | 172/177 |
| 3,177,830 | 4/1965 | Zimmerman | 111/85 |
| 3,319,590 | 5/1967 | Zimmerman | 111/85 |
| 3,385,243 | 5/1968 | Zimmerman | 111/85 |
| 3,394,669 | 7/1968 | Ten Pas et al. | 111/85 |
| 4,196,679 | 4/1980 | Moore | 111/85 |
| 4,508,177 | 4/1985 | Wiser | 172/177 |

FOREIGN PATENT DOCUMENTS

| | | | |
|---|---|---|---|
| 81324 | 10/1956 | Denmark | 172/555 |
| 889523 | 7/1953 | Fed. Rep. of Germany | 111/85 |
| 127968 | 12/1928 | Switzerland | 111/85 |
| 904542 | 2/1982 | U.S.S.R. | 111/87 |
| 700597 | 12/1953 | United Kingdom | 111/85 |

Primary Examiner—Deborah L. Kyle
Assistant Examiner—Stephen Johnson
Attorney, Agent, or Firm—Wells, St. John & Roberts

[57] ABSTRACT

A press wheel improvement for seed drills in which one or more open recesses are presented through the circular rim of the press wheel to form transverse dams along packed furrow walls. The recesses are bounded by walls that present a projecting tab extended beyond the conical wheel surfaces. A complementary insert can be fastened to each tab when damming of the furrows is not desired or required by field conditions. The tabs cooperate with straw walkers to assist in clearing trash and preventing obstruction of the straw walkers by rocks wedged between them and the conical press wheel walls.

8 Claims, 2 Drawing Sheets

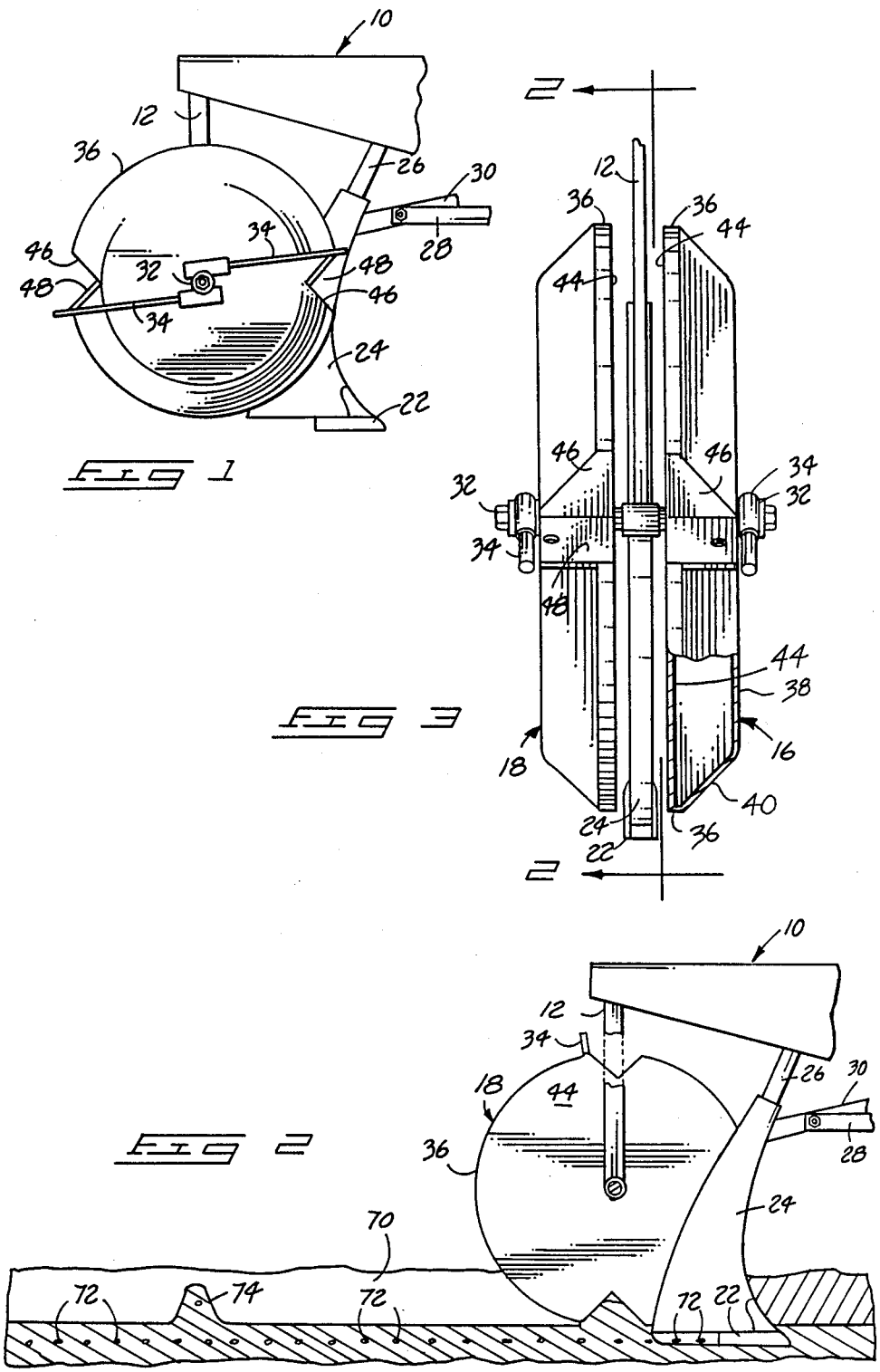

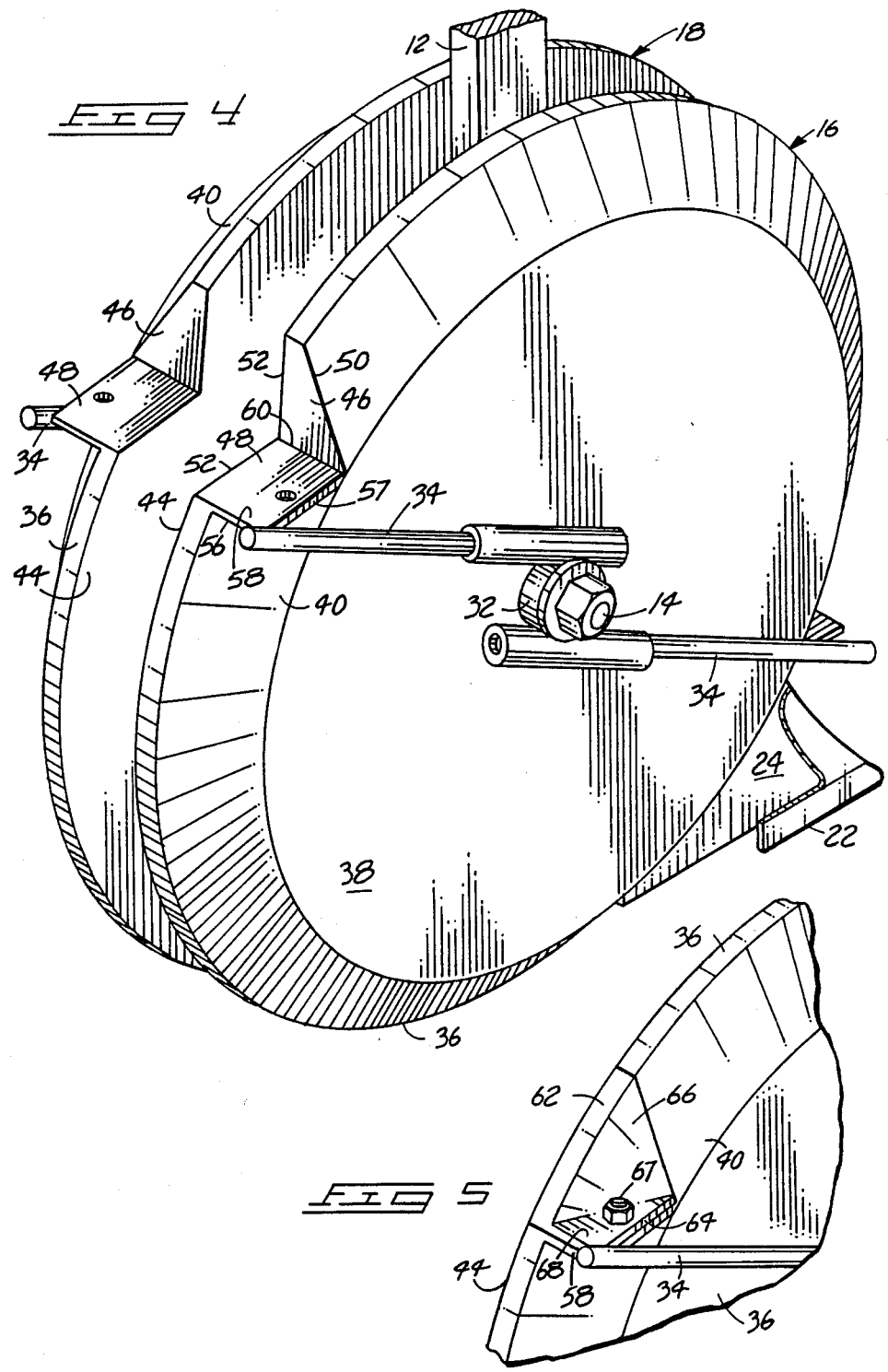

PRESS WHEELS FOR SEED DRILLS

TECHNICAL FIELD

This disclosure pertains to deep furrow drills for seeding crops such as grain. It specifically relates to improvements in press wheels for packing the sides of furrows within which seeds are planted.

BACKGROUND OF THE INVENTION

This invention relates to an improvement in a seed drill of the type disclosed in my U.S. Pat. No. 3,177,830, which was issued on Apr. 13, 1965. Modifications of this type of seed drill are disclosed in my U.S. Pat. Nos. 3,319,590, issued May 16, 1967 and 3,385,243, issued May 28, 1968. The disclosures of my three prior patents are hereby incorporated within this disclosure by reference.

The seed drills disclosed in my referenced U.S. patents are designed for deep furrow seeding of crops. Seed is planted at the bottom of a furrow having packed sloped sides. This is accomplished by placing the seeds into soil behind a narrow shovel overlapped closely by single or paired press wheels. Each press wheel is mounted alongside the path of a shovel to pack the sloping sides of a deep furrow and assure accurate control of both planting depth and proper soil coverage over the seeds.

One problem encountered in fields where the sides of the furrows have been packed by the seed drill configurations shown in these prior patents is the tendency of the relatively deep, open furrows to concentrate snow and rain runoff, leading to soil erosion. Such erosion can wash out the planted crop within the furrows and aggravate adjacent environmental conditions, such as drainage into nearby streams or lakes. The tendency of water to flow along the packed furrow walls can also result in loss of critical moisture required for continuing nourishment and growth of the planted crop. The present invention incorporates a modification of the press wheel which leads to formation of transverse soil dams at longitudinally spaced positions across each packed furrow. These small dams impede or interrupt passage of water along the furrow length.

Various devices have been proposed in the past for intermittently damming agricultural furrows, both during field cultivation and during planting. One example of a dammer attachment for a furrow seeder is shown in U.S. Pat. No. 2,193,275, issued Mar. 12, 1940. The disclosed device comprises a transverse blade that intermittently scoops soil behind the furrow former as the blade is raised or lowered in the furrow.

A rotating attachment for forming dams in furrows behind a planter is shown in U.S. Pat. No. 2,098,738. The device utilizes radial scraper blades that project to the sides of arcuate wheel sections which press along the center of the seeded furrow.

Neither of the above devices has the capability of forming a furrow with tightly packed side walls. Both are concerned with forming transverse soil dams intermittently across loosely packed furrows. Scooping the soil within a furrow by use of a transverse blade that extends across the planted seeds risks the potential disturbance of the seeds unless depth control for the blade can be very accurately maintained, a condition almost impossible to guarantee, particularly when the soil surface is not perfectly level. Furthermore, the rolling engagement of the dammer shown in U.S. Pat. No. 2,098,738 would pack soil over the planted seeds, which can be detrimental to initial seed emergence. The present invention intermittently forms dams across packed sides of a furrow without subjecting the soil located vertically over the planted seeds to any vertical packing pressure.

Other devices for intermittently damming furrows are shown in U.S. Pat. Nos. 2,196,038, issued Apr. 2, 1940, 2,236,832, issued Apr. 1, 1941 and 2,780,975, issued Feb. 12, 1957. Operation of the devices shown in these patents appears to result in substantial soil disturbance within the furrow. They do not appear to be readily adaptable to usage within a furrow containing planted seeds.

U.S. Pat. No. 4,508,177, issued Apr. 2, 1985, shows a device for forming dams intermittently between the rows of a crop by use of a freely rotating spider mounted behind field cultivation shanks. It is designed for intermittently damming a field surface between the planted rows or furrows, rather than along such furrows. The unacceptable seed disturbance that would result were such a spider used along a planted furrow is believed to be obvious.

The known earlier equipment for producing intermittent dams in planted field areas or furrows are not applicable to the critical planting techniques used in dry land farming where grain seeds are accurately spaced along deep furrows having dry soil sides. Any damming accessory that disturbs th sides of a deep furrow without careful control risks collapse of the furrow walls and reduction in seed germination rates. Such damming methods can be used in irrigated farming, where seed is broadcast at relatively high seeding rates and loss of germination is of minor consequence. However, the deep furrows leading to a single row of carefully placed seed in moist soil cannot be disrupted, once they are formed, without serious crop loss. The present improvement forms carefully controlled dams simultaneously with packing of the furrow sides. This assures that the furrow will be intact and that no seed will be covered with soil at a level that will affect germination.

The present invention utilizes a recess that interrupts the continuity of a press wheel rim. As the press wheel rotates in engagement with the sides of a furrow, the recess leaves intermittent piles of soil across the furrow. The rear wall of the recess preferably includes a transverse tab projecting outwardly at the rim of the press wheel. The provision of such a tab, with or without an adjacent recess, assists the press wheel in clearing adjacent trash encountered by it in a field, particularly under no-till or minimum till seeding conditions. By angularly locating the tab adjacent to the termination of a straw walker typically mounted alongside the press wheel, one can eliminate the tendency of rocks to wedge between the press wheel and straw walker. The recess formed in the press wheel can be selectively closed by mounting a complementary insert to it. The insert will maintain the tab configuration on the press wheel to assure trash clearance and obstruction of rocks even when intermittent damming across the furrow is not desired.

BRIEF DESCRIPTION OF THE DRAWINGS

The preferred embodiment of the invention is illustrated in the accompanying drawings, in which:

FIG. 1 is a side view of a seed drill equipped according to this disclosure;

FIG. 2 is a sectional view taken along side the furrow opener, illustrating its use in planting a field;

FIG. 3 is an enlarged front view of a furrow opener and press wheel combination;

FIG. 4 is a perspective view of the furrow opener and press wheel combination the lower portion of one press wheel being shown in a vertical section to illustrate its hollow structure; and FIG. 5 is a fragmentary perspective view showing the addition of an insert complementary to the press wheel recesses.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Referring to FIGS. 1-3, the frame of a grain drill is indicated by reference numeral 10. It includes a downwardly extending rigid standard 12 that rotatably supports a transverse axle 14 for the illustrated planting assembly. The planting assembly includes paired press wheels 16 and 18 which are coaxially fixed to the transverse axle 14.

The paired press wheels 16 and 18 are narrowly spaced apart from one another to receive a furrow opener between them. Each furrow opener includes a supporting seed boot 24 and a shovel 22 which forms a slot through the soil as the drill passes along a field area. Seed is directed through the seed boot 24 from a flexible seed tube 26 that leads to a supply hopper (not shown) mounted on frame 10.

The seed boot 24 has a forwardly projecting arm 28 pivoted to an associated drag bar 30. The general structure of the drill is more fully described in U.S. Pat. Nos. 3,177,830, 3,319,590 and 3,385,243, which are incorporated by reference into the present disclosure.

In a preferred form of the invention intended for use under no-till or minimum tillage conditions, trash walkers are provided at one side or both sides of the paired press wheels 16 and 18. The trash walkers include a bracket 32 affixed to the rotatable axle 14. Replaceable rods 34 extend outward from bracket 32 to positions adjacent to the peripheries of press wheels 16 and 18. Further details regarding the trash walkers can be found in the referenced U.S. Pat. Nos. 3,319,590 and 3,385,243. They prevent buildup of field trash forwardly of the seed boot 24 and shovel 22 so that soil penetration is not impeded.

Each press wheel includes a solid circular peripheral rim 36 formed about the transverse central axis of the rotating axle 14 to which it is fixed. A coaxial solid circular wall 38 in each press wheel is perpendicular to the central axis and has a diameter smaller than that of the rim. The rim 36 and periphery of circular wall 38 are joined by a solid coaxial conical wall 40. When press wheels 16 and 18 are mounted in pairs alongside a furrow opener, the conical walls 40 are inclined outwardly from the overlapped supporting seed boot 24 of the shovel 22 with which the press wheels are associated.

The rim 36, circular wall 38, and conical wall 40 are the essential operative elements of each press wheel 16 or 18, since they pack the soil surfaces directly adjacent to the shovel 22. However, it is preferable to enclose the wheel structure by means of a second coaxial solid circular wall 44. Wall 44 is also perpendicular to the central axis of axle 14 and leads to the rim 36 to complete a hollow press wheel structure in conjunction with the above-described press wheel components.

The press wheel structures as described to this point are conventional and have been in widespread use. They effectively pack the side surfaces of a tapered furrow having seed placed at the bottom of the furrow during passage of shovel 22. The packing action of the paired press wheels 16 and 18 maintain the furrow in an open condition, while assuring proper soil coverage above each seed. The deep furrow permits seed to be planted below the moisture line in a field, despite the fact that there might be several inches of dry soil above that line. The deep furrows also concentrate field moisture about the seeds, which is particularly important when planting winter wheat and other grain crops under dry land farming techniques.

The present modification to press wheel 16 and 18 can best be understood from FIG. 4, which shows the continuity of the rim 36, conical wall 40 and second circular wall 44 being interrupted by one or more recesses. In the specific embodiment illustrated, two such recesses are located diametrically apart about the rim 36. Their depth extends to the joinder between the conical wall 40 and first circular wall 38. Each recess is formed in a wedge shape, with the wedge apex angle being approximately 90 to 120 degrees, but the specfic angle and shape of the recess is not vital to an understanding of this improvement. The wide angle helps to assure that soil in the recesses will drop at the bottom of the furrow and not remain packed within it as the press wheels rotate along the furrows.

The purpose of the recesses about the press wheels is to intermittently interrupt the pressing of the furrow sides, allowing soil to collect in the recesses and to thereby periodically form small soil dams across the otherwise open longitudinal furrow. Such dams can effectively impede passage of water along the furrows and thereby substantially reduce soil and seed erosion. They also preserve moisture in the furrow for the seeds and plants growing within it. Since the small dams of soil will be subject to little compaction, and to no compaction directly above the centrally located seeds, emergence of sprouting plants through the dams is not a problem. In fact, the emergence of the sprouting plants in each dam reinforces the dam structure and assures it continuation as the plants grow to maturity.

By incorporating the dam-forming recesses within the furrow-forming press wheels 16 and 18, the small dams of soil across each furrow can be accurately formed and spaced from one another without risking collapse of the rather fragile side furrow walls. The furrow is pressed outwardly in dry soil, and any mechanical disturbance of the side walls will seriously impede seed germination by covering the seed too heavily.

As shown in FIG. 4, the rcesss formed about the press wheel 16 and 18 are bounded by a front wall 46 and an intersecting rear wall 48. The walls 46 and 48 intersect one another along an apex 60 formed at a location spaced radially inward from the rim 36. The transverse front wall 36 has one side edge 50 flush with the conical wall 40. Its opposite side edge 52 is flush with the second circular wall 44 at the inside of the press wheel. The illustrated shape of front wall 46 is substantially triangular to complement the wall structures to which it is joined.

The rear wall 48 has a substantially rectangular shape, with one side edge 52 being flush with the second circular wall 44. The second side edge 56 of the rear wall 48 is located outwardly of the conical wall 40 to form a solid transverse tab 58 that projects outwardly beyond conical wall 40. The tab 58 is bounded by outer edges 56 and 57 leading from the first circular wall 38 to the rim 36.

The transverse tabs 58 assist in forming a dam across the open recesses that interrupt the press wheel peripheries by scooping additional soil from the sides of the furrow and lightly packing the soil as each tab 50 rolls along the furrow. The packing occurs because the transverse tabs 58 are not oriented radially relative to the central axis of axle 14.

The transverse tabs 58 located within the confines of the press wheels serve additional functions beyond formation of soil dams across the furrow. They impale field trash as they roll downward along the seed boot 24 and shovel 22, thereby helping to keep the seed boot 24 and shovel 22 clear for more efficient soil penetration and furrow formation. The trash drops from tab 58 as the tab rolls upwardly upon emerging from the furrow, if it has not already been dropped at the bottom of the furrow and lightly packed as part of the soil dam formed across the furrow.

It has also been found advantageous to locate the outer corner of each tab 58 directly adjacent to the outer ends of the trash walker rods 34. By spanning the open space that would otherwise exist between rim 36 and the outer end of each rod 34, tabs 58 serve to prevent wedging of rocks between the conical wall 40 of each press wheel and the adjacent straw walker rods 34. This has been found to eliminate a condition which substantially reduces the effectiveness of the straw walkers during use of this type of drill.

In order to accommodate all types of field conditions, including those where intermittent dams are not desired across the seeded furrows, there is shown in FIG. 5 a complementary insert 62 fixed within a press wheel recess. The removable insert can be fastened within an open recess by a bolt assembly shown at 67. The insert includes a rim section 64 and conical wall section 66 that complete the continuity of the rim 36 and conical wall 40, respectively. Where the press wheel 16 and 18 are formed as completed hollow structures, the insert would also include a complementary side wall section to serve as the completion of the second circular wall 44 as well.

To facilitate fastening of insert 62 within a recess, it preferably has a tab 68 corresponding in shape to the previously described projecting tab 58 presented by the rear wall 48 at each wedge shaped recess. Tab 68 can be directly fastened to tab 58 in an overlying position by means of the removable bolt assembly 67.

It is to be noted that the operational features previously described with respect to the projecting tab 58 are retained when the inserts 62 are in use. Thus, the benefits of improved trash clearance and rock obstruction are available in a press wheel configuration that includes essentially uninterrupted outside wall surfaces. In fact, this disclosure is intended to encompass uninterrupted press wheels of the type described in the referenced prior patents, with transverse tabs projecting from the conical surfaces as described herein.

The operation of the modified press wheels is believed to be clear from the above description and the illustration provided in FIG. 2. The placement of seed 72 at the bottom of each furrow is not modified from the procedures followed according to the teachings of the referenced U.S. patents. However, the pressing of the furrows walls 70 is intermittently interrupted by transverse dams 74 of lightly packed soil and field trash collected within each recess. Since the recess walls 46 and 48 terminate at the inner surfaces of the circular walls 44 on each press wheel, there is no vertical pressure exerted directly above the seeds 72. The spaced dams 74 can effectively retard flow of water along the packed furrow walls 70, thereby permitting the water to soak into the soil for use by the planted crop. This is particularly advantageous along hillsides and uneven planted field areas. As the sprouted plants grow through the transverse dams 74, the plants themselves will reinforce the dam structure and assure its continuation to minimize field erosion.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A press wheel for packing a sloping side of a furrow when rotatably mounted on a seed drill in an oppositely facing pair of press wheels with a furrow opener between them, the press wheel comprising:

a solid circular peripheral rim formed about a transverse central axis;

a coaxial solid circular wall perpendicular to the central axis and offset from the rim along the central axis, the diameter of the circular wall being less than the diameter of the rim;

and a solid coaxial conical wall joining the rim and the circular wall, the conical wall being inclined outwardly from the rim;

the rim and conical wall having a recess formed therein that intermittently interrupts the packing of furrow sides as the press wheel rolls within a furrow, allowing soil to collect in the recess to form soil dams across the furrow that impede passage of water along the furrow and reduce soil and seed erosion;

the recess being formed by two solid transverse walls that intersect one another along an apex formed at a location spaced radially inward from the rim, one transverse wall being projected outwardly beyond the conical wall;

and a removable insert releasably fastened to the one transverse wall and located within the recess, the insert having a complementary rim section and a complementary conical wall section that complete the rim and conical wall, respectively.

2. A press wheel for packing a sloping side of a furrow when rotatably mounted on a seed drill in an oppositely facing pair of press wheels with a furrow opener between them, the press wheel comprising:

a solid circular peripheral rim formed about a transverse central axis;

a first coaxial solid circular wall perpendicular to the central axis and offset from the rim along the central axis, the diameter of the first circular wall being less than the diameter of the rim;

a solid coaxial conical wall joining the rim and the first circular wall;

and a second solid coaxial circular wall perpendicualr to the central axis and axially spaced from the first circular wall, the second circular wall being joined to the rim to complete a hollow press wheel structure;

the rim, conical wall and second circular wall havng an outwardly open recess formed therein across transverse wall surfaces that intermittently interrupt the packing of a furrow side as the press wheel rolls within a furrow, allowing soil to collect in the recess and form soil dams across the furrow to impede passage of water along the furrow and reduce soil and seed erosion.

3. The press wheel of claim 2, futher comprising:
a removable insert releasably fastened within the recess, the insert having a complementary rim section, a complementary conical wall section and a complementary second circular wall section that complete the rim, conical wall and second circular wall, respectively.

4. The press wheel of claim 2 wherein the recess is formed by solid front and rear transverse walls that intersect one another along an apex formed at a location spaced radially inward from the rim.

5. The press wheel of claim 2 wherein the recess is formed by solid front and rear transverse walls that intersect one another along an apex formed at a location spaced radially inward from the rim, the front and rear transverse walls each having coplanar side edges flush with the second circular wall.

6. The press wheel of claim 2 wherein the recess is formed by solid front and rear transverse walls that intersect one another along an apex formed at a location spaced radially inward from the rim, the front and rear transverse walls each having coplanar first side edges flush with the second circular wall, the front wall having a second side edge flush with the conical wall and the rear transverse wall having a second side edge located outward of the conical wall enabling it to impale field trash as the press wheel rotates within a furrow.

7. The press wheel of claim 2 wherein the recess is formed by solid front and rear transverse walls that intersect one another along an apex formed at a location spaced radially inward from the rim, the rear transverse wall being rectangular in shape.

8. The press wheel of claim 2 wherein the recess is formed by solid front and rear transverse walls that intersect one another along an apex formed at a location spaced radially inward from the rim, the front and rear transverse walls each having coplanar first side edgs flush with the second circular wall, the front wall having a second side edge flush with the conical wall and the rear transverse wall having a second side edge located outward of the conical wall enabling it to impale field trash as the press wheel rotates within a furrow; and
a removable insert releasably fastened to the rear transverse wall within the recess, the insert having a complementary rim section, a complementary conical wall section and a complementary second circular wall section that complete the rim, conical wall and second circular wall, respectively.

* * * * *